(12) United States Patent
Li et al.

(10) Patent No.: US 12,095,157 B2
(45) Date of Patent: Sep. 17, 2024

(54) WAVE-SHAPED GROUND STRUCTURE FOR ANTENNA ARRAYS

(71) Applicant: Aptiv Technologies AG, Schaffhausen (CH)

(72) Inventors: Mingjian Li, Santa Clara, CA (US); Shawn Shi, Thousand Oaks, CA (US); Zhengzheng Li, Agoura Hills, CA (US)

(73) Assignee: Aptiv Technologies AG, Schaffhausen (CH)

( * ) Notice: Subject to any disclaimer, the term of this patent is extended or adjusted under 35 U.S.C. 154(b) by 527 days.

(21) Appl. No.: 17/383,623

(22) Filed: Jul. 23, 2021

(65) Prior Publication Data
US 2022/0384942 A1    Dec. 1, 2022

Related U.S. Application Data

(60) Provisional application No. 63/195,603, filed on Jun. 1, 2021.

(51) Int. Cl.
*H01Q 1/48* (2006.01)
*G01S 7/02* (2006.01)
(Continued)

(52) U.S. Cl.
CPC .............. *H01Q 1/48* (2013.01); *G01S 7/028* (2021.05); *G01S 7/038* (2013.01); *G01S 13/931* (2013.01); *H01Q 21/08* (2013.01)

(58) Field of Classification Search
None
See application file for complete search history.

(56) References Cited

U.S. PATENT DOCUMENTS 7,898,722 B2 * 3/2011 Miles ................. G02B 26/0841
359/290
8,547,280 B2 * 10/2013 Yang .................... H01Q 21/062
343/789
(Continued)

FOREIGN PATENT DOCUMENTS

| EP | 3477770 A1 | 5/2019 |
| KR | 102033311 B1 | 10/2019 |
| WO | 2021058450 A1 | 4/2021 |

OTHER PUBLICATIONS

"Extended European Search Report", EP Application No. 22160903.5, Aug. 30, 2022, 8 pages.

*Primary Examiner* — Bernarr E Gregory
(74) *Attorney, Agent, or Firm* — Harness, Dickey & Pierce, P.L.C.

(57) ABSTRACT

This document describes techniques, apparatuses, and systems for a wave-shaped ground structure for antenna arrays. A radar system may include a ground structure with a first surface having a wave shape and a second surface opposite the first surface. The ground structure includes multiple antenna arrays separated in a longitudinal direction on the first surface. Each antenna array includes one or more antenna elements configured to emit or receive electromagnetic (EM) energy. The ground structure also includes antenna feeds separated in the longitudinal direction on the second surface and operably connected to the antenna arrays. The wave shape of the ground structure configures the radar system to provide an antenna radiation pattern that provides a uniform radiation pattern among the antenna arrays. The wave shape can also be configured to provide an asymmetrical radiation pattern or a narrow beamwidth for specific applications.

21 Claims, 14 Drawing Sheets

(51) Int. Cl.
 *G01S 7/03* (2006.01)
 *G01S 13/931* (2020.01)
 *H01Q 21/08* (2006.01)

(56) References Cited

U.S. PATENT DOCUMENTS

| | | |
|---|---|---|
| 2008/0088519 A1 | 4/2008 | Quan et al. |
| 2016/0134021 A1* | 5/2016 | Helander ............... H01Q 21/08 343/893 |

* cited by examiner

WAVE-SHAPED GROUND STRUCTURE FOR ANTENNA ARRAYS

CROSS-REFERENCE TO RELATED APPLICATIONS

This application claims the benefit under 35 U.S.C. 119(e) of U.S. Provisional Application No. 63/195,603, filed Jun. 1, 2021, the disclosures of which are incorporated by reference in their entirety herein.

BACKGROUND

Some devices (e.g., radar systems) use electromagnetic signals to detect and track objects. The electromagnetic signals are generally transmitted and received using multiple antennas. The antenna elements of an antenna may be located on or in an approximately planar or flat ground structure. The radiation pattern of an antenna may be characterized by gain or beamwidth, which indicates gain as a function of direction. Planar ground structures, however, can introduce varied radiation patterns among antenna arrays. The varied radiation patterns can introduce cross-interference among the antenna arrays and worsen the performance (e.g., sensitivity or angular resolution) of a multiple-input, multiple-output (MIMO) radar system.

In addition, precisely controlling its radiation pattern can improve the application of a radar system. For example, many automotive applications require radar systems that provide a narrow beamwidth or asymmetrical beamwidth to detect objects within a particular field-of-view (e.g., in a vehicle's travel path). Planar ground structures can generate a wider beamwidth than that desired for some applications.

SUMMARY

This document describes techniques, apparatuses, and systems for a wave-shaped ground structure for antenna arrays. A radar system may include a ground structure with a first surface having a wave shape and a second surface opposite the first surface. Multiple antenna arrays are separated in a longitudinal direction on the first surface. Each antenna array includes one or more antenna elements configured to emit or receive electromagnetic (EM) energy. The ground structure also includes antenna feeds separated in the longitudinal direction on the second surface and operably connected to the antenna arrays. The wave shape of the ground structure configures the radar system to provide an antenna radiation pattern that provides a uniform radiation pattern among the antenna arrays. The wave shape can also be configured to provide an asymmetrical radiation pattern or a narrow beamwidth for specific applications.

This document also describes methods performed by the above-summarized techniques, apparatuses, and systems, and other methods set forth herein, as well as means for performing these methods.

This Summary introduces simplified concepts related to a wave-shaped ground structure for antenna arrays, further described in the Detailed Description and Drawings. This Summary is not intended to identify essential features of the claimed subject matter, nor is it intended for use in determining the scope of the claimed subject matter.

BRIEF DESCRIPTION OF THE DRAWINGS

The details of one or more aspects of a wave-shaped ground structure for antenna arrays are described in this document with reference to the following figures. The same numbers are often used throughout the drawings to reference like features and components.

DETAILED DESCRIPTION

Overview

Figure 1:
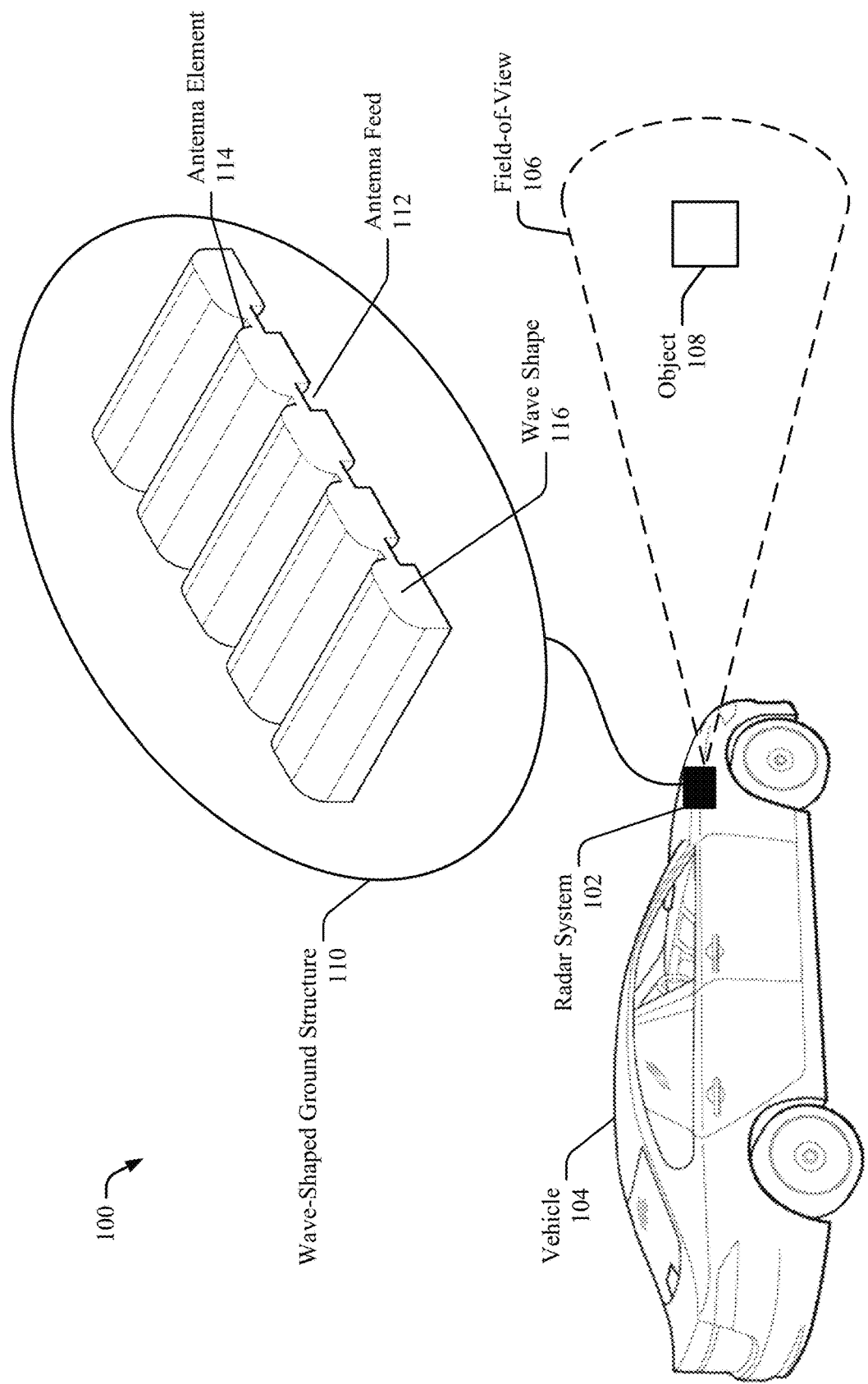
FIG. 1 illustrates an example environment in which a radar system with a wave-shaped ground structure for antenna arrays is used on a vehicle.

Radar systems are a sensing technology that some automotive systems use to acquire information about the surrounding environment. Radar systems generally use an antenna to direct electromagnetic energy or signals being transmitted or received. Such radar systems can use multiple antenna elements in an array or multiple arrays to provide increased gain and directivity than the radiation pattern achievable with a single antenna element. Signals from the multiple antenna elements are combined with appropriate phases and weighted amplitudes to provide the desired radiation pattern.

Consider a ground structure used to transfer electromagnetic energy to and from the antenna elements. The ground structure generally includes an array of antenna elements in or on a surface of an approximately planar ground structure. Manufacturers may select the number and arrangement of the antenna elements to provide the desired phasing, combining, or splitting of electromagnetic energy. For example, the antenna elements can be equally spaced on the surface of the planar ground structure. This antenna element arrangement combined with the planar ground structure generally provides a wide radiation pattern, but it can introduce varied radiation patterns among the antenna arrays. These non-uniform radiation patterns among the antenna arrays can result in cross-interference between the antenna arrays.

In contrast, this document describes a wave-shaped ground structure for antenna arrays configured to provide relatively uniform radiation patterns among the antenna arrays to reduce cross-interference. The uniform radiation patterns can also improve the performance of a MIMO radar system. The wave-shaped ground structure includes a first surface having a wave shape. For example, the wave shape can include rounded corners and wave-shaped bumps (e.g., waves). The wave shape can be sized and designed relative to the antenna arrays to generate a radiation pattern with a desired beamwidth (e.g., a wide beamwidth but uniform radiation patterns, a narrow beamwidth, or an asymmetrical radiation pattern). The wave-shaped ground structure also includes multiple antenna arrays on the first surface (e.g., positioned between individual waves of the wave shape). Each antenna array generally includes multiple antenna elements that can emit or receive electromagnetic energy. The wave-shaped ground structure also includes antenna feeds operably connected to the antenna arrays on a second surface, which is opposite the first surface.

The described wave-shaped ground structure may be particularly advantageous for use in an automotive context, such as detecting objects in a roadway in a vehicle's travel path. The uniform radiation pattern among antenna arrays reduces cross-interferences and results in improved performance of MIMO radar systems. In addition, the configurable beamwidth allows a radar system of the vehicle to detect objects in a particular field-of-view (e.g., immediately in front of the vehicle). As one example, a radar system placed near the front of a vehicle can use a narrow beamwidth to focus on detecting objects immediately in front of the vehicle instead of objects located toward a side of the vehicle.

This example wave-shaped ground structure is just one example of the described techniques, apparatuses, and systems of a wave-shaped ground structure for antenna arrays. This document describes other examples and implementations.

Operating Environment

FIG. 1 illustrates an example environment 100 in which a radar system 102 with a wave-shaped ground structure 110 is used on a vehicle 104. The vehicle 104 may use the wave-shaped ground structure 110 to enable operations of the radar system 102 configured to determine a proximity, an angle, or a velocity of one or more objects 108 in the proximity of the vehicle 104.

Although illustrated as a car, the vehicle 104 can represent other types of motorized vehicles (e.g., a motorcycle, a bus, a tractor, a semi-trailer truck, or construction equipment), non-motorized vehicles (e.g., a bicycle), railed vehicles (e.g., a train or a trolley car), watercraft (e.g., a boat or a ship), aircraft (e.g., an airplane or a helicopter), or spacecraft (e.g., satellite). In general, manufacturers can mount the radar system 102 to any moving platform, including moving machinery or robotic equipment. In other implementations, other devices (e.g., desktop computers, tablets, laptops, televisions, computing watches, smartphones, gaming systems, and so forth) may incorporate the radar system 102 with the wave-shaped ground structure 110 and support techniques described herein.

In the depicted environment 100, the radar system 102 is mounted near, or integrated within, a front portion of the vehicle 104 to detect the object 108 and avoid collisions. The radar system 102 provides a field-of-view 106 towards the objects 108. The radar system 102 can project the field-of-view 106 from any exterior surface of the vehicle 104. For example, vehicle manufacturers can integrate the radar system 102 into a bumper, side mirror, headlights, rear lights, or any other interior or exterior location where the objects 108 require detection. In some cases, the vehicle 104 includes multiple radar systems 102, such as a first radar system 102 and a second radar system 102 that provide a larger field-of-view 106. In general, vehicle manufacturers can design the locations of the radar systems 102 to provide a particular field-of-view 106 that encompasses a region of interest, including, for instance, in or around a travel lane aligned with a vehicle path.

Example fields-of-view 106 include a 360-degree field-of-view, one or more 180-degree fields-of-view, one or more 90-degree fields-of-view, and so forth, which can overlap or be combined into a field-of-view 106 of a particular size.

The described wave-shaped ground structure 110 includes antenna feeds 112, antenna elements 114, and wave shapes 116 to provide a uniform radiation pattern among antenna arrays. The antenna feeds 112 operably connect to the antenna elements 114. The antenna feeds 112 include a hollow channel (e.g., to contain a dielectric, such as air). The antenna elements 114 are positioned on a surface of the wave-shaped ground structure 110 opposite the antenna feeds 112. The antenna elements 114 are configured to allow electromagnetic energy to dissipate to the environment 100 or to detect electromagnetic energy. The wave shapes 116 are formed on the surface of the wave-shaped ground structure 110. The wave shapes 116 provide a contoured shape in between antenna arrays of the wave-shaped ground structure 110. The wave shapes 116 are configured to provide uniform radiation patterns among the antenna arrays and control a characteristic of the radiation pattern.

The radiation pattern of the wave-shaped ground structure 110 can include a wide beamwidth, asymmetrical coverage, or narrow coverage in the azimuth plane and/or the elevation plane. As one example, the radar system 102 placed near the front of the vehicle 104 can use a narrow beamwidth to focus on detecting objects immediately in front of the vehicle 104 (e.g., in a travel lane aligned with a vehicle path) instead of objects located toward a side of the vehicle 104 (e.g., ahead of the vehicle 104 and in an adjacent travel lane to the vehicle path). For example, the narrow coverage can concentrate the radiated EM energy within plus or minus approximately 20 to 45 degrees of a direction following a travel path of the vehicle 104. As another example, the described wave-shaped ground structure 110 may provide a relatively uniform radiation pattern with the radiated EM energy within plus or minus approximately 75 degrees of the travel-path direction. As yet another example, the described wave-shaped ground structure 110 may provide asymmetrical coverage or an asymmetrical beamwidth that can concentrate the radiated EM energy within 30 to 90 degrees of a direction following a travel path of the vehicle 104.

The object 108 is composed of one or more materials that reflect radar signals. Depending on the application, the object 108 can represent a target of interest. In some cases, the object 108 can be a moving object or a stationary object. The stationary objects can be continuous (e.g., a concrete barrier, a guard rail) or discontinuous (e.g., a traffic cone) along a road portion.

The radar system 102 emits electromagnetic radiation by transmitting one or more electromagnetic signals or waveforms via the antenna elements 114. In the environment 100, the radar system 102 can detect and track the object 108 by transmitting and receiving one or more radar signals. For example, the radar system 102 can transmit electromagnetic signals between one hundred and four hundred gigahertz (GHz), between four and one hundred GHz, or between approximately seventy and eighty GHz.

The radar system 102 can determine a distance to the object 108 based on the time it takes for the signals to travel from the radar system 102 to the object 108 and from the object 108 back to the radar system 102. The radar system 102 can also locate the object 108 in terms of an angle based on the direction of a maximum amplitude echo signal received by the radar system 102.

As described above, the radar system 102 can be part of the vehicle 104. The vehicle 104 can also include at least one automotive system that relies on data from the radar system 102, including a driver-assistance system, an autonomous-driving system, or a semi-autonomous-driving system. The radar system 102 can include an interface to such automotive systems. The radar system 102 can output, via the interface, a signal based on electromagnetic energy received by the radar system 102.

Generally, the automotive systems use radar data provided by the radar system 102 to perform a function. For example, the driver-assistance system can provide blind-spot monitoring and generate an alert indicating a potential collision with the object 108 detected by the radar system 102. In this case, the radar data from the radar system 102 indicates when it is safe or unsafe to change lanes. In addition, the autonomous-driving system may move the vehicle 104 to a particular location on the road while avoiding collisions with the object 108. The radar data provided by the radar system 102 can provide information about the distance to and the location of the object 108 to enable the autonomous-driving system to perform emergency braking, change langes, or adjust the speed of the vehicle 104.

The radar system 102 generally includes a transmitter (not illustrated) and at least one antenna array, including the wave-shaped ground structure 110, to transmit electromagnetic signals. The radar system 102 generally includes a receiver (not illustrated) and at least one antenna array, including the wave-shaped ground structure 110, to receive reflected versions of these electromagnetic signals. The transmitter includes components for emitting electromagnetic signals. The receiver includes components to detect the reflected electromagnetic signals. The transmitter and the receiver can be incorporated together (e.g., on the same integrated circuit) or separately (e.g., on different integrated circuits).

The radar system 102 also includes one or more processors (not illustrated) and computer-readable storage media (CRM) (not illustrated). The processor can be a microprocessor or a system-on-chip. The processor executes instructions stored within the CRM. As an example, the processor can control the operation of the transmitter. The processor can also process electromagnetic energy received by the antenna array(s) and determine the location of the object 108 relative to the radar system 102. The processor can also generate radar data for the automotive systems. For example, the processor can control, based on processed electromagnetic energy from the antenna array(s), an autonomous or semi-autonomous driving system of the vehicle 104.

The wave-shaped ground structure 110 can be any solid material, including wood, carbon fiber, fiber glass, metal, plastic, or a combination thereof. The wave-shaped ground structure 110 can also include a printed circuit board (PCB). The wave-shaped ground structure 110 mechanically supports and electrically connects components (e.g., the antenna feeds 112 and the antenna elements 114) using conductive materials.

This document describes example embodiments of the wave-shaped ground structure 110 to provide a particular radiation pattern in greater detail with respect to FIGS. 2 through 8C. The particular radiation pattern allows the radar system 102 of the vehicle 104 to detect objects 108 in a particular field-of-view 106 (e.g., immediately in front of the vehicle). As just one example, a radar system 102 placed near the front of a vehicle 104 can use a narrow beamwidth in one plane (e.g., the azimuth plane) to focus on detecting objects 108 immediately in front of the vehicle 104 instead of objects located toward a side of the vehicle 104.

Figure 2A:
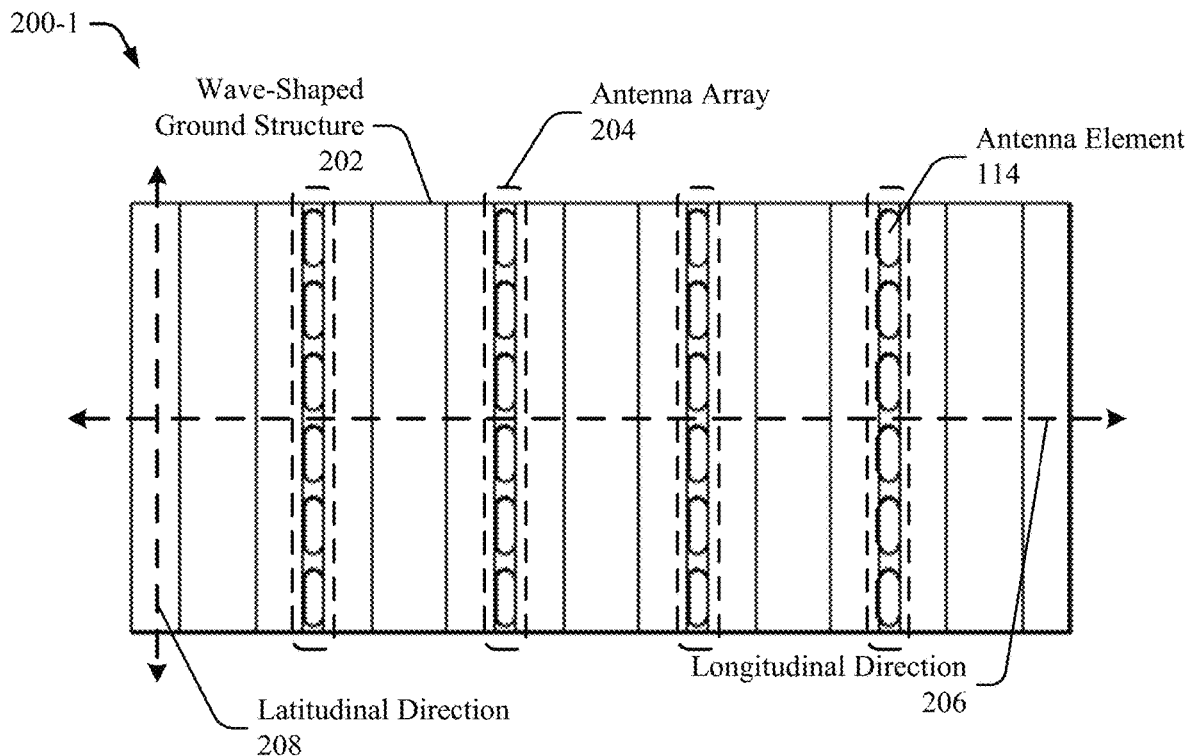
FIGS. 2A, 2B, and 2C illustrate views of an example wave-shaped ground structure for antenna arrays.
Figure 2B:
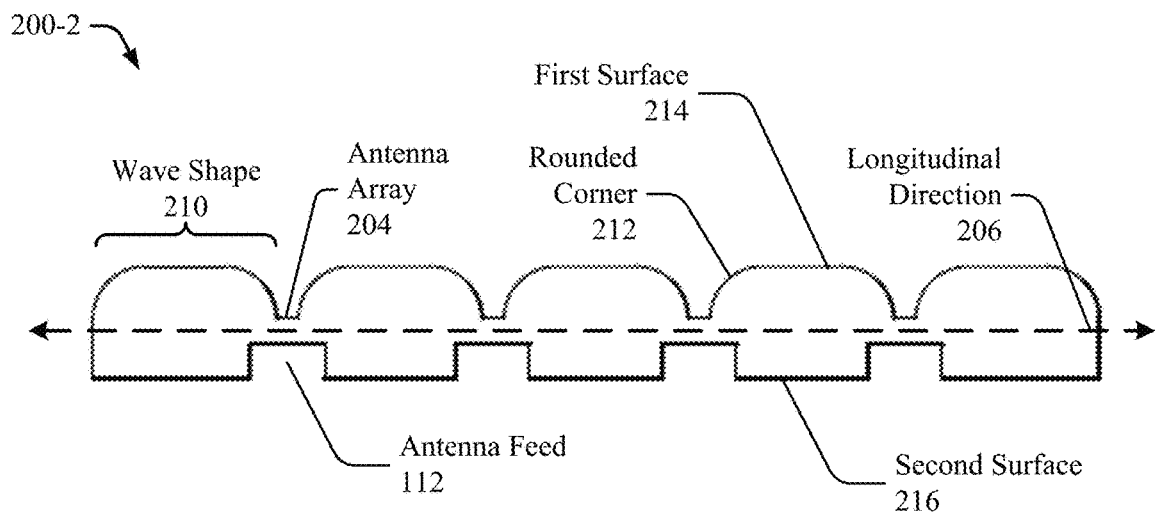
Figure 2C:
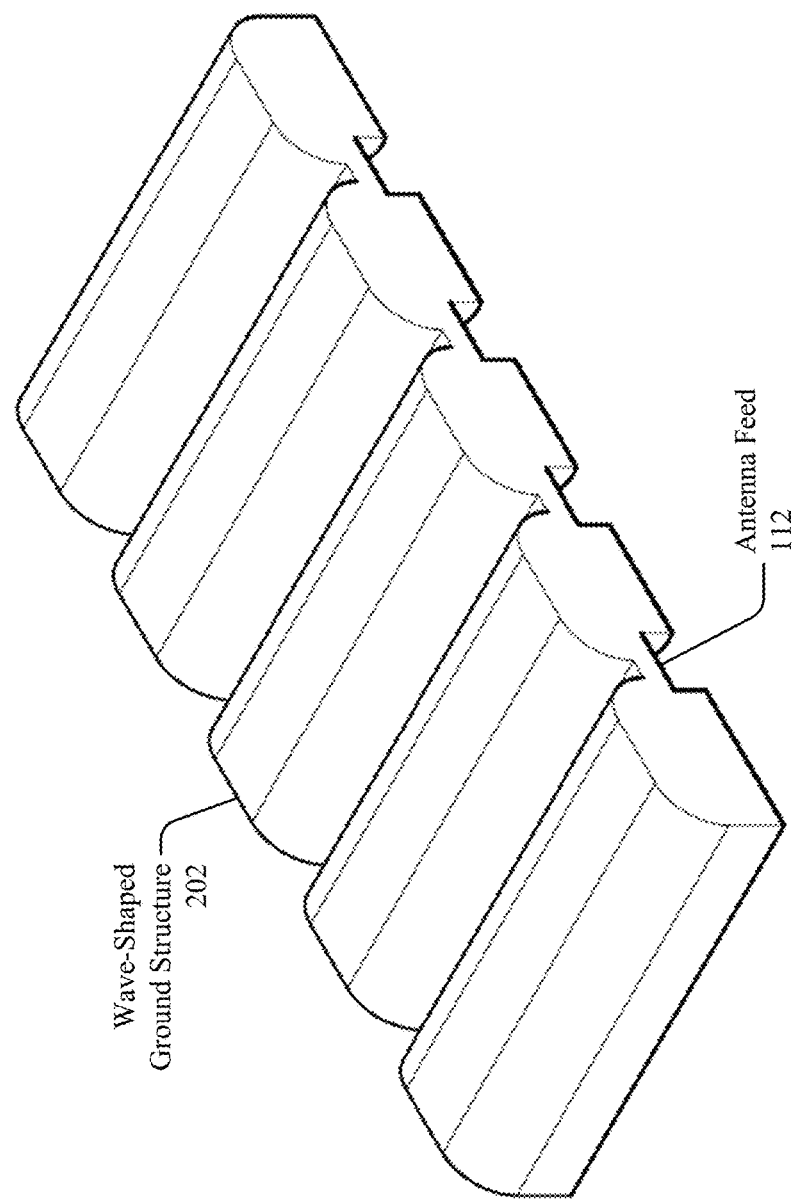

FIGS. 2A, 2B, and 2C illustrate views 200-1, 200-2, and 200-3, respectively, of an example wave-shaped ground structure 202 for antenna arrays. The wave-shaped ground structure 202 is an example of the wave-shaped ground structure 110 of FIG. 1. The views 200-1, 200-2, and 200-3 provide a top, side, and perspective view of the wave-shaped ground structure 202, respectively.

The wave-shaped ground structure 202 includes the antenna feeds 112, the antenna elements 114, and a wave shape 210. The wave-shaped ground structure 202 also includes multiple antenna arrays 204 separated in a longitudinal direction 206 along a first surface 214. Each antenna array 204 includes one or more antenna elements 114 configured to emit or detect electromagnetic (EM) energy. The antenna arrays 204 can include aperture antennas, microstrip antennas, microstrip patch antennas, dipole antennas, substrate-integrated waveguide (SIW) antennas, slot array antennas, waveguide end-array antennas, or horn antennas. The antenna arrays 204 of the wave-shaped ground structure 202 can include transmit antennas to emit EM energy or receive antennas to detect EM energy. The wave-shaped ground structure 202 can also include a subset of transmit antenna arrays and a subset of receive antenna arrays. The antenna arrays 204 are generally uniformly positioned in the longitudinal direction 206 and include an equal number of antenna elements 114. The antenna elements 114 of the antenna arrays 204 are generally uniformly positioned in a latitudinal direction 208. The latitudinal direction 208 is orthogonal or perpendicular to the longitudinal direction 206.

The antenna elements 114 or the antenna arrays 204 operably connect to a respective antenna feed 112. The antenna feeds 112 are positioned on or in a second surface 216 of the wave-shaped ground structure 202. The second surface 216 is opposite the first surface 214 of the wave-shaped ground structure 202. The antenna feeds 112 are generally uniformly positioned in the longitudinal direction 206.

As depicted in FIG. 2B, the antenna feeds 112 can form an approximately rectangular opening or channel in the side view 200-2 of the wave-shaped ground structure 202. In other implementations, the antenna feeds 112 can form an approximately square, oval, or circular opening in the side view 200-2 of the wave-shaped ground structure 202.

Figure 3A:
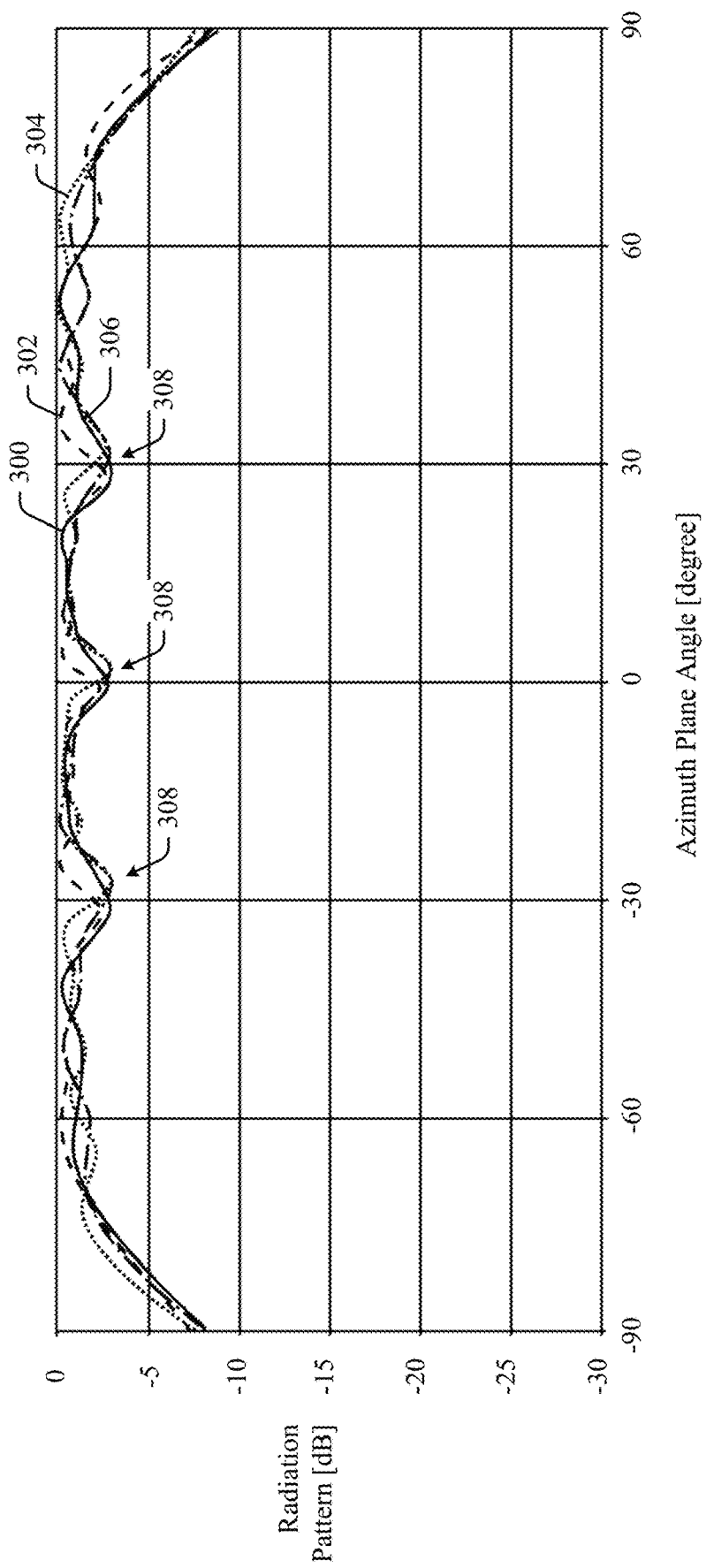
FIGS. 3A and 3B illustrate radiation patterns associated with example ground structure without and with wave shapes, respectively.
Figure 3B:
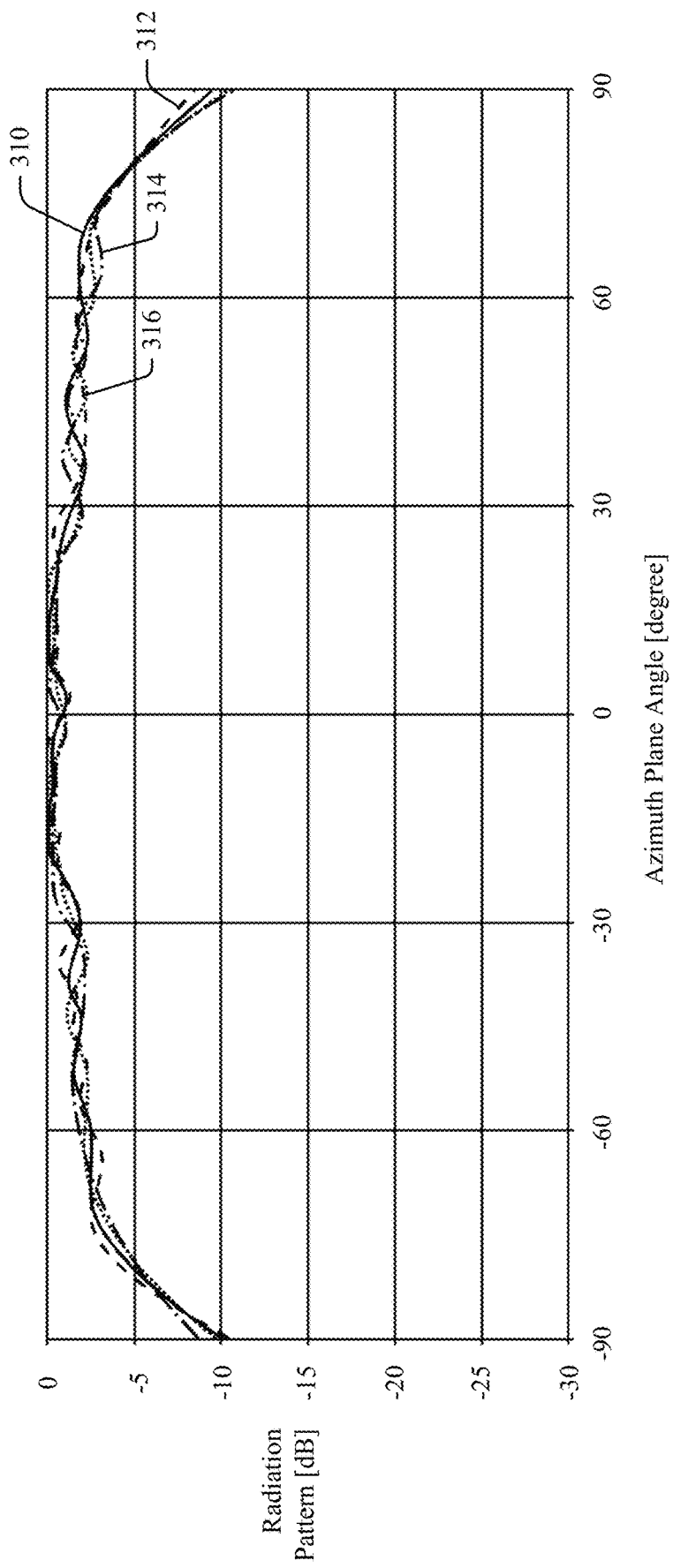

As illustrated in the side view 200-2, the first surface 214 of the wave-shaped ground structure 202 includes wave shapes 210 adjacent to and between the antenna arrays 204. The wave shape 210 includes rounded corners 212. As illustrated in FIGS. 3A and 3B, the wave shapes 210 of the wave-shaped ground structure 202 allow the antenna arrays 204 to generate a radiation pattern with a wide beamwidth in an azimuth or elevation plane. The wave shapes 210 also improve the similarity of radiation patterns of the antenna arrays 204 in an azimuthal or elevational plane. The specific size of the wave shapes 210 and the rounded corners 212 can be configured to vary the beamwidth and characteristics of the radiation patterns. The specific size of the wave shapes 210 and the rounded corners 212 can be determined by building and optimizing a model of the wave-shaped ground structure 202 to produce the desired radiation pattern.

FIG. 3A illustrates radiation patterns 300, 302, 304, and 306 associated with an example ground structure without wave shapes. For example, the ground structure associated with FIG. 3A can be a planar ground structure for antenna arrays. The example ground structure without wave shapes can generate the radiation patterns 300, 302, 304, and 306 with a relatively wide beamwidth in an azimuth plane. The radiation patterns 300, 302, 304, and 306 include ripples 308, but the ripples 308 do not coincide for each radiation pattern. For example, the radiation pattern 300 includes a ripple 308 at approximately −33 degrees and the radiation pattern 306 includes a similar ripple 308 at approximately −27 degrees. As a result, the radiation patterns 300, 302, 304, and 306 are dissimilar in the azimuth plane, introducing cross-interference among the antenna arrays 204.

In contrast to FIG. 3A, FIG. 3B illustrates radiation patterns 310, 312, 314, and 316 associated with an example ground structure with wave shapes (e.g., the wave shapes 210 of the wave-shaped ground structure 202 of FIGS. 2A through 2C). Similar to the radiation patterns 300, 302, 304, and 306 of FIG. 3A, the radiation patterns 310, 312, 314, and 316 of the wave-shaped ground structure 202 have a relatively wide beamwidth in the azimuth plane. However, the radiation patterns 310, 312, 314, and 316 are more uniform and include smaller ripples. As a result, the wave-shaped ground structure 202 introduces less cross-interference among the antenna arrays 204.

Figure 4A:
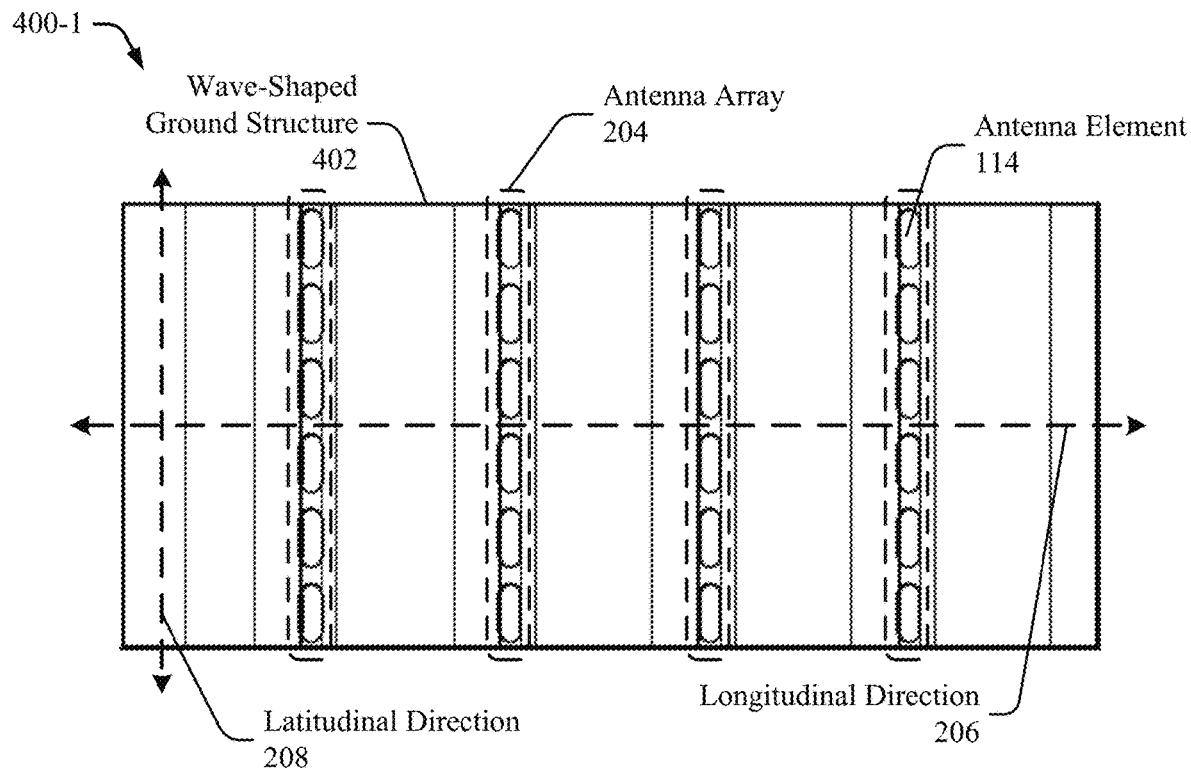
FIGS. 4A, 4B, and 4C illustrate views of another example wave-shaped ground structure for antenna arrays.
Figure 4B:
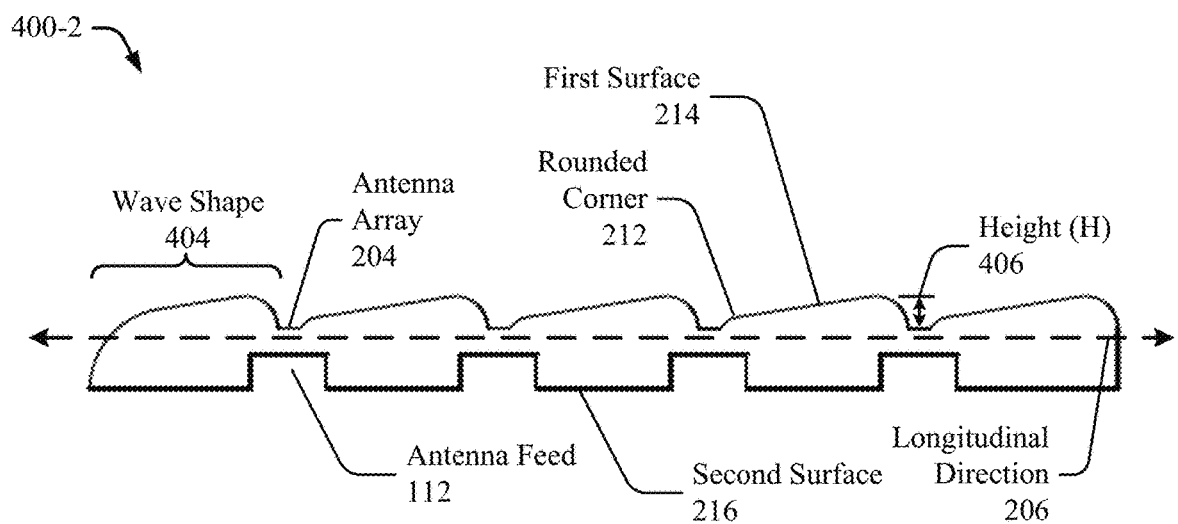
Figure 4C:
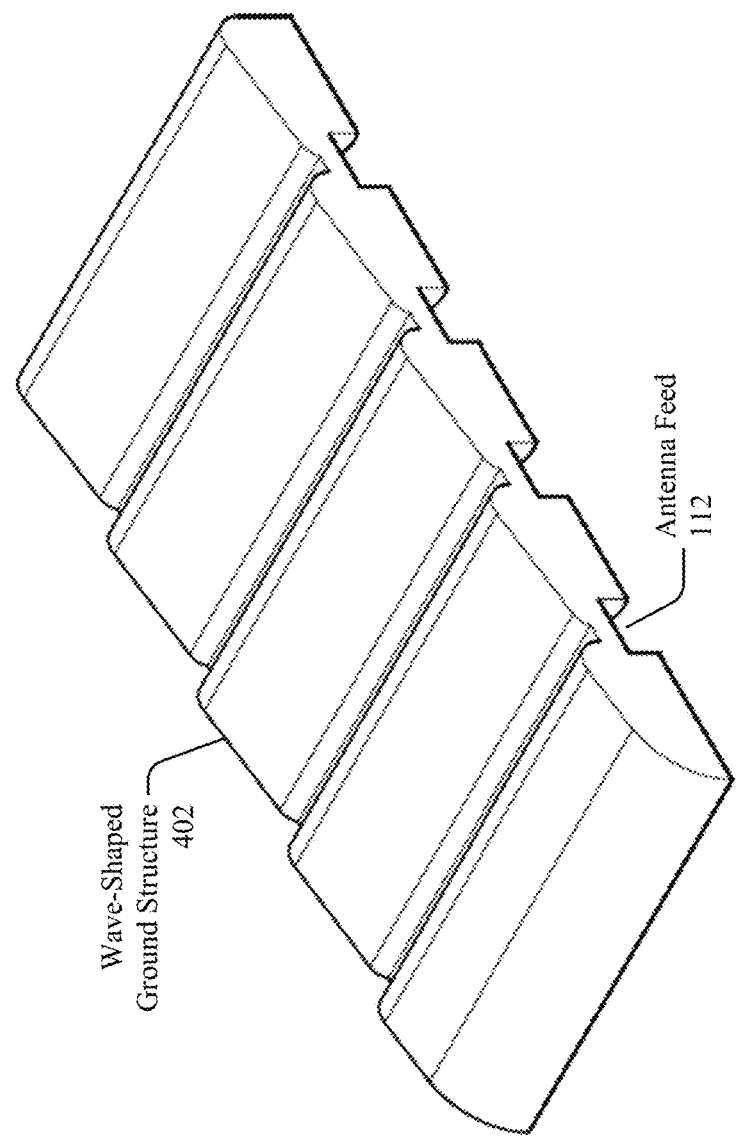

FIGS. 4A, 4B, and 4C illustrate views 400-1, 400-2, and 400-3, respectively, of an example wave-shaped ground structure 402 for the antenna arrays 204. The wave-shaped ground structure 402 is another example of the wave-shaped ground structure 110 of FIG. 1. The views 400-1, 400-2, and 400-3 provide a top, side, and perspective view of the wave-shaped ground structure 402, respectively.

The wave-shaped ground structure 402 includes the antenna feeds 112, the antenna elements 114, and a wave shape 404. The wave-shaped ground structure 402 also includes multiple antenna arrays 204 separated in a longitudinal direction 206 along the first surface 214. Each antenna array 204 includes one or more antenna elements 114 configured to emit or detect electromagnetic (EM) energy. The antenna arrays 204 can include aperture antennas, microstrip antennas, microstrip patch antennas, dipole antennas, SIW antennas, slot array antennas, waveguide end-array antennas, or horn antennas. The antenna arrays 204 of the wave-shaped ground structure 402 can include transmit antennas to emit EM energy or receive antennas to detect EM energy. The wave-shaped ground structure 402 can also include a subset of transmit antenna arrays and a subset of receive antenna arrays. The antenna arrays 204 are generally uniformly positioned in the longitudinal direction 206 and include an equal number of antenna elements 114. The antenna elements 114 of the antenna arrays 204 are generally uniformly positioned in the latitudinal direction 208.

The antenna elements 114 or the antenna arrays 204 operably connect to a respective antenna feed 112. The antenna feeds 112 are positioned on or in the second surface 216 of the wave-shaped ground structure 402. The second surface 216 is opposite the first surface 214 of the wave-shaped ground structure 402. The antenna feeds 112 are generally uniformly positioned in the longitudinal direction 206.

As depicted in FIG. 4B, the antenna feeds 112 can form an approximately rectangular opening or channel in the side view 400-2 of the wave-shaped ground structure 402. In other implementations, the antenna feeds 112 can form an approximately square, oval, or circular opening in the side view 400-2 of the wave-shaped ground structure 402.

As illustrated in the side view 400-2, the first surface 214 of the wave-shaped ground structure 402 includes the wave shapes 404 adjacent to and between the antenna arrays 204. The wave shape 404 includes rounded corners 212 and a height (H) 406. The wave shape 404 can represent a triangular shape or pyramid shape, such as an approximately right-triangle shape with rounded corners. In the depicted implementation, the height 406 of the wave shape 404 increases from left to right along the longitudinal direction 206. The height 406 of the wave shape 404 can increase from right to left along the longitudinal direction 206 in other implementations.

Figure 5:
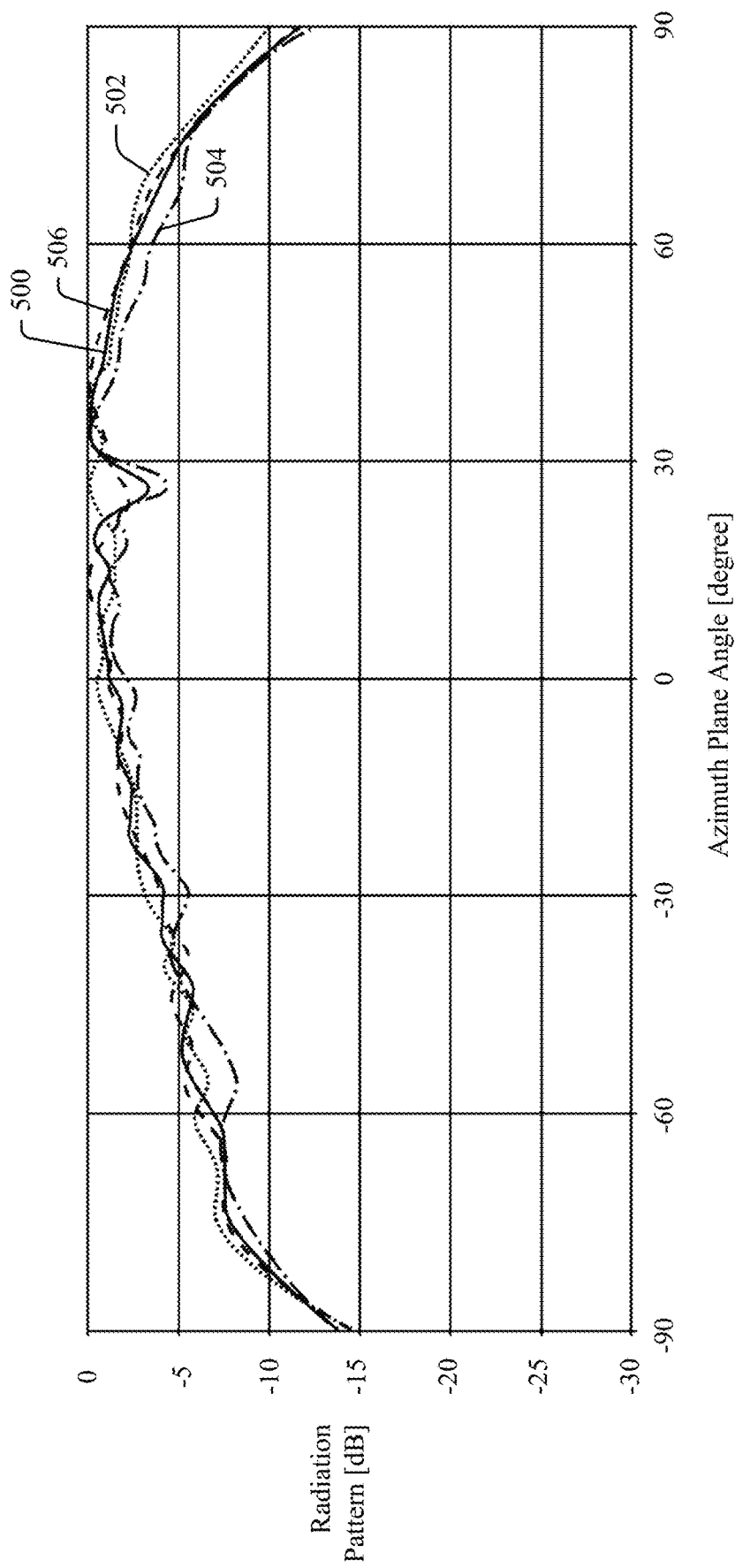
FIG. 5 illustrates radiation patterns associated with another example wave-shaped ground structure.

As illustrated in FIG. 5, the wave shapes 404 of the wave-shaped ground structure 402 allow the antenna arrays 204 to generate an asymmetrical radiation pattern in an azimuth or elevation plane and a higher gain within a desired portion of the field-of-view. The asymmetrical radiation pattern may be particularly advantageous for use in an automotive context, such as detecting objects in a roadway in a vehicle's travel path. The asymmetrical coverage allows a vehicle's radar system to detect objects in a particular portion of the field-of-view (e.g., immediately in front of the vehicle) but still detect objects in the remaining portion of the field-of-view (e.g., toward the side of the vehicle). As one example, a radar system placed near the front of a vehicle can use an asymmetrical radiation pattern in one plane to focus on detecting objects immediately in front of the vehicle instead of objects located toward a side of the vehicle. As a specific example, the asymmetrical coverage or asymmetrical beamwidth can concentrate the radiated EM energy within 30 to 90 degrees of a direction following a travel path of the vehicle 104. In contrast, a ground structure without the described wave shapes 404 may provide a relatively uniform radiation pattern with the radiated EM energy within plus or minus approximately 90 degrees of the travel-path direction.

The rounded corners 212 of the wave shapes 404 can improve the similarity of azimuthal or elevational radiation patterns of the antenna arrays 204. The height 406 of the wave shapes 404 can be configured to vary the asymmetrical radiation pattern. The height 406 of the wave shapes 404 can be determined by building and optimizing a model of the wave-shaped ground structure 402 to produce the desired radiation pattern.

FIG. 5 illustrates radiation patterns 500, 502, 504, and 506 associated with the wave-shaped ground structure 402. The radiation patterns 500, 502, 504, and 506 of the wave-shaped ground structure 402 have an asymmetrical radiation pattern in the azimuth plane. For example, the energy of the radiation patterns 500, 502, 504, and 506 is focused between 0 and 45 degrees in the azimuth plane. The wave-shaped ground structure 402 can generate asymmetrical radiation patterns 500, 502, 504, and 506. As a result, a radar system can focus the radiation patterns on a portion of the field-of-view where potential objects-of-interest are more likely to be located. As one example, a radar system placed near the front of a vehicle can use the asymmetrical radiation patterns 500, 502, 504, and 506 in one plane to focus on detecting objects immediately in front of the vehicle 104 instead of objects located toward a side of the vehicle 104.

Figure 6A:
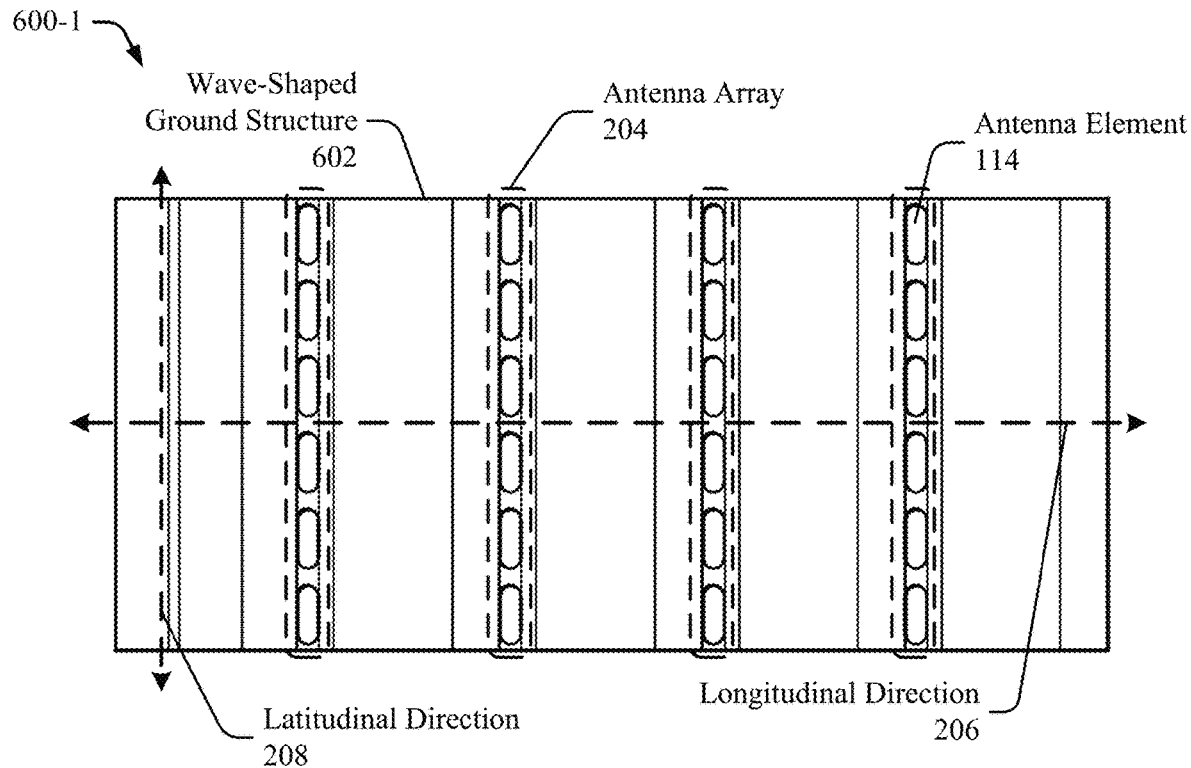
FIGS. 6A, 6B, and 6C illustrate views of another example wave-shaped ground structure for antenna arrays.
Figure 6B:
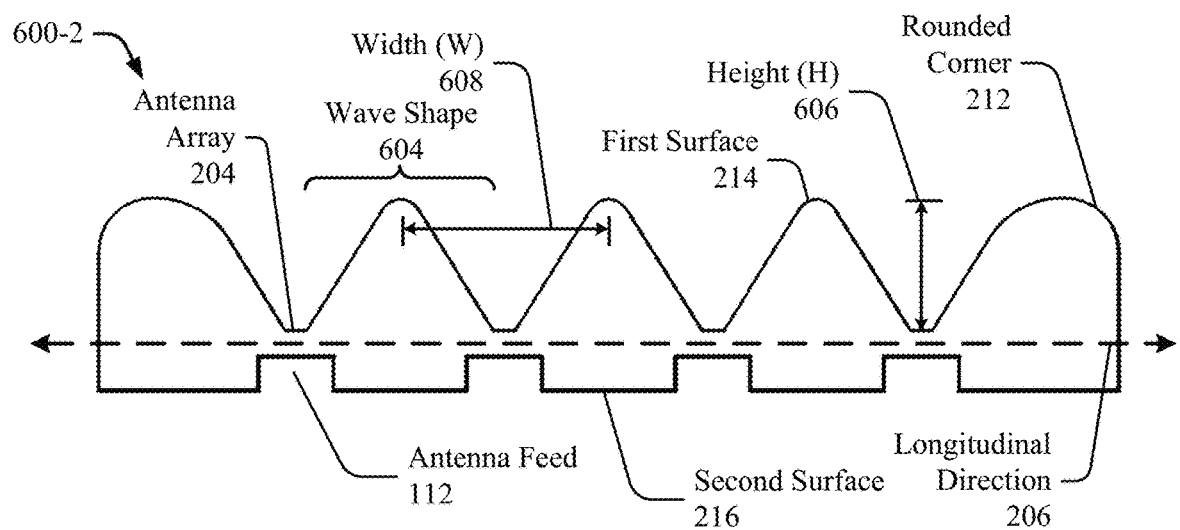
Figure 6C:
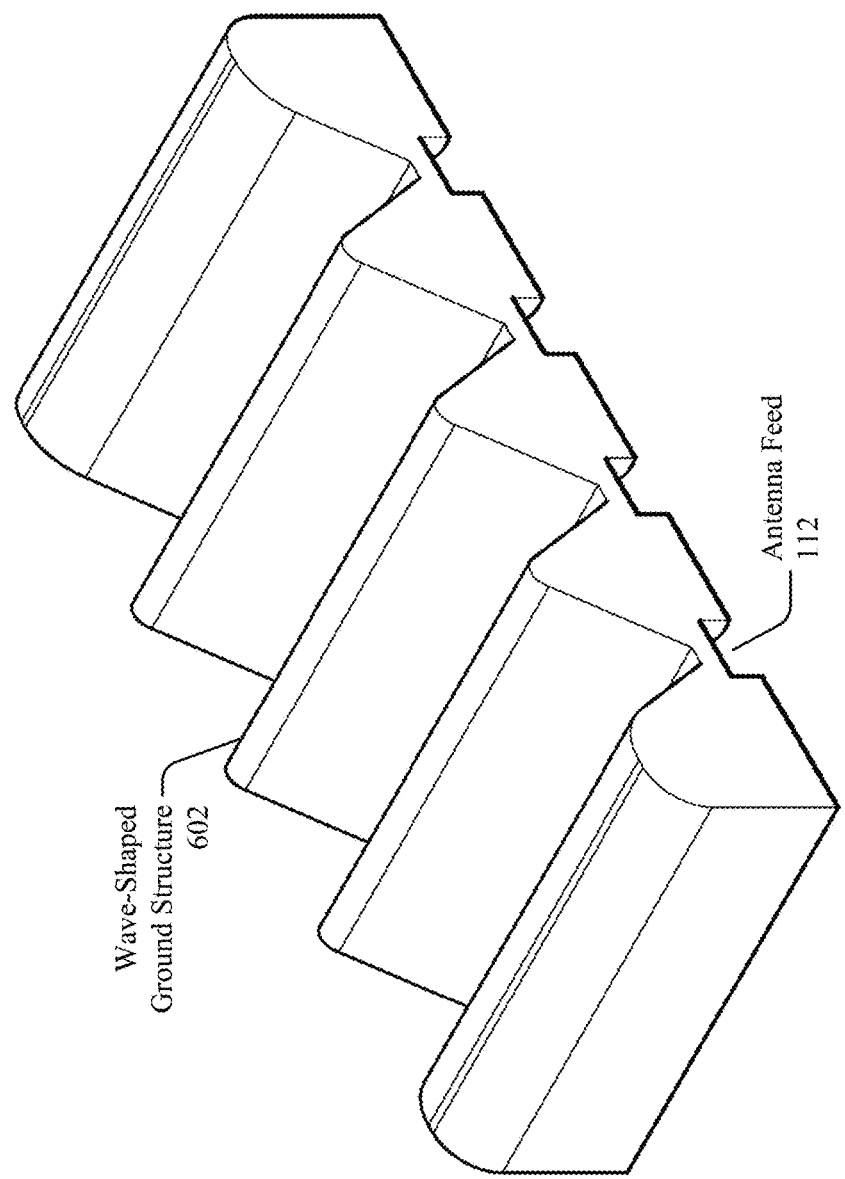

FIGS. 6A, 6B, and 6C illustrate views 600-1, 600-2, and 600-3, respectively, of an example wave-shaped ground structure 602 for the antenna arrays 204. The wave-shaped ground structure 602 is another example of the wave-shaped ground structure 110 of FIG. 1. The views 600-1, 600-2, and 600-3 provide a top, side, and perspective view of the wave-shaped ground structure 602, respectively.

The wave-shaped ground structure 602 includes the antenna feeds 112, the antenna elements 114, and a wave shape 604. The wave-shaped ground structure 602 also includes multiple antenna arrays 204 separated in the longitudinal direction 206 along the first surface 214. Each antenna array 204 includes one or more antenna elements 114 configured to emit or detect electromagnetic (EM) energy. The antenna arrays 204 can include aperture antennas, microstrip antennas, microstrip patch antennas, dipole antennas, SIW antennas, slot array antennas, waveguide end-array antennas, or horn antennas. The antenna arrays 204 of the wave-shaped ground structure 602 can be transmit antennas to emit EM energy or receive antennas to detect EM energy. The wave-shaped ground structure 602 can also include a subset of transmit antenna arrays and a subset of receive antenna arrays. The antenna arrays 204 are generally uniformly positioned in the longitudinal direction 206 and include an equal number of antenna elements 114. The antenna elements 114 of the antenna arrays are generally uniformly positioned in the latitudinal direction 208.

The antenna elements 114 or the antenna arrays 204 operably connect to a respective antenna feed 112. The antenna feeds 112 are positioned on or in the second surface 216 of the wave-shaped ground structure 602. The second surface 216 is opposite the first surface 214 of the wave-shaped ground structure 602. The antenna feeds 112 are generally uniformly positioned in the longitudinal direction 206.

As depicted in FIG. 6B, the antenna feeds 112 can form an approximately rectangular opening or channel in the side view 600-2 of the wave-shaped ground structure 602. In other implementations, the antenna feeds 112 can form an approximately square, oval, or circular opening in the side view 600-2 of the wave-shaped ground structure 602.

As illustrated in the side view 600-2, the first surface 214 of the wave-shaped ground structure 602 includes the wave shapes 604 adjacent to and between the antenna arrays 204. The wave shape 604 includes the rounded corners 212, a height (H) 606, and a width (W) 608. The wave shape 604 can represent a triangular shape or pyramid shape, such as an approximately isosceles-triangle shape with rounded corners.

Figure 7:
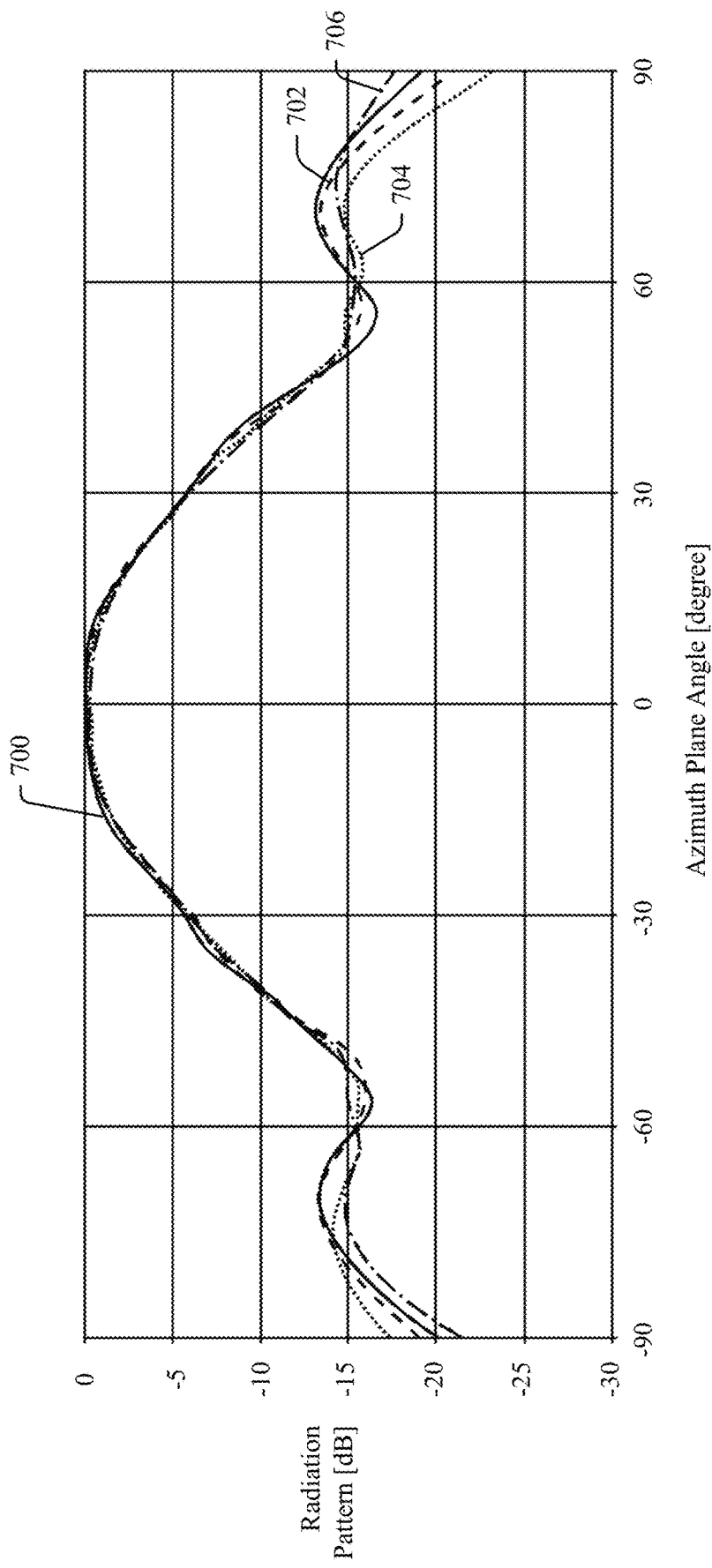
FIG. 7 illustrates radiation patterns associated with another example wave-shaped ground structure.

As illustrated in FIG. 7, the wave shapes 604 of the wave-shaped ground structure 602 allow the antenna arrays 204 to generate a narrow radiation pattern in an azimuth or elevation plane and a higher gain within a desired portion of the field-of-view. The narrow radiation pattern may be particularly advantageous for use in an automotive context, such as detecting objects in a roadway in a vehicle's travel path. The narrow beamwidth allows a vehicle's radar system to detect objects in a particular field-of-view (e.g., immediately in front of the vehicle). As one example, a radar system placed near the front of a vehicle can use a narrow beamwidth to focus on detecting objects immediately in front of the vehicle instead of objects located toward a side of the vehicle. As a specific example, the narrow coverage or beam width can concentrate the radiated EM energy within −30 to 30 degrees of a direction following a travel path of the vehicle 104. In contrast, a waveguide without the described wave-shaped ground structure 602 may provide a relatively wide radiation pattern.

The rounded corners 212 of the wave shapes 604 also improve the similarity of radiation patterns of the antenna arrays 204 in an azimuthal or elevational plane. The height 606 and the width 608 of the wave shapes 604 can be configured to vary the narrow radiation pattern. For example, the height 606 and the width of the wave shape 604 can be determined by building and optimizing a model of the wave-shaped ground structure 602 to produce the desired radiation pattern.

FIG. 7 illustrates radiation patterns 700, 702, 704, and 706 associated with the wave-shaped ground structure 602. The radiation patterns 700, 702, 704, and 706 of the wave-shaped ground structure 602 have a narrow radiation pattern in the azimuth plane with the energy focused on a particular portion of the antenna radiation pattern. In the illustrated example, the radiation pattern of the wave-shaped ground structure is concentrated between approximately −30 and 30 degrees. The wave-shaped ground structure 602 can generate the narrow radiation pattern in the azimuth plane to enable a radar system to focus the radiation pattern of a corresponding antenna on a portion of the field-of-view where potential objects of interest are more likely to be located. As one example, a radar system placed near the front of a vehicle can use a narrow radiation pattern in one plane to focus on detecting objects immediately in front of the vehicle. The radiation patterns 700, 702, 704, and 706 also have relatively uniform radiation patterns, resulting in less cross-interference.

Figure 8A:
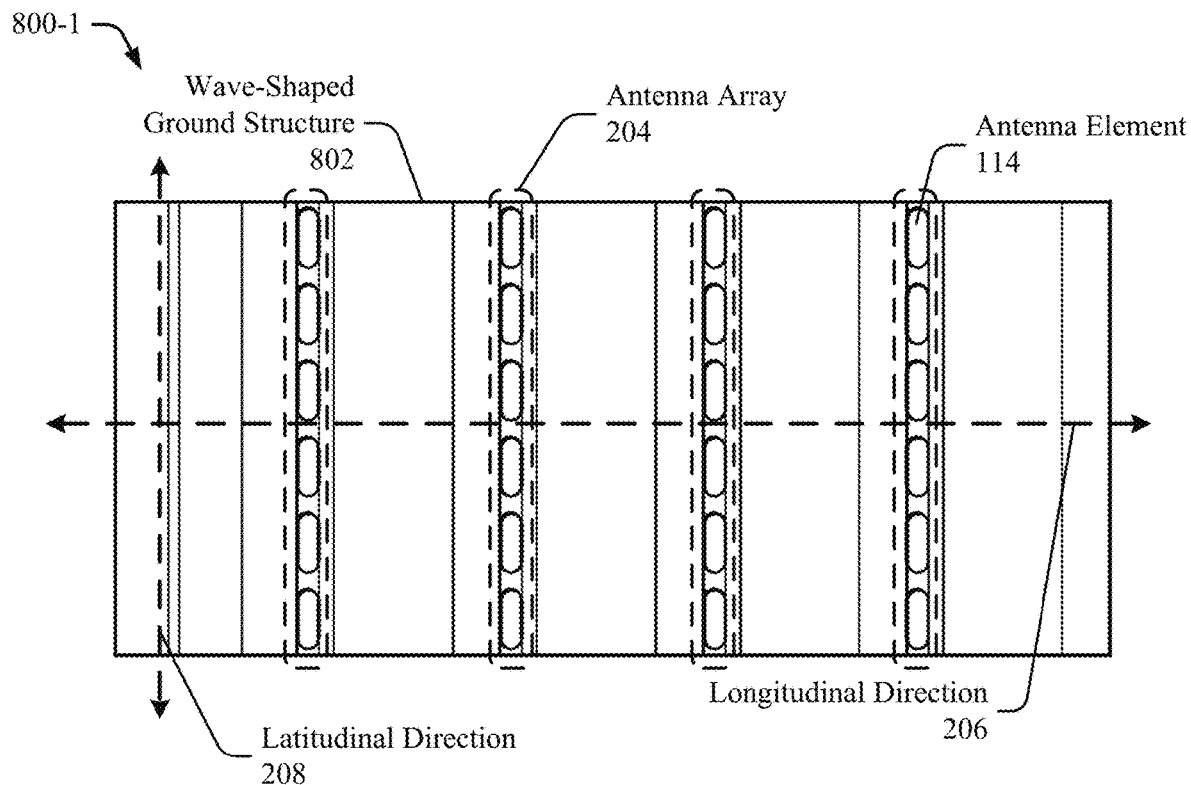
FIGS. 8A, 8B, and 8C illustrate views of another example wave-shaped ground structure for antenna arrays.
Figure 8B:
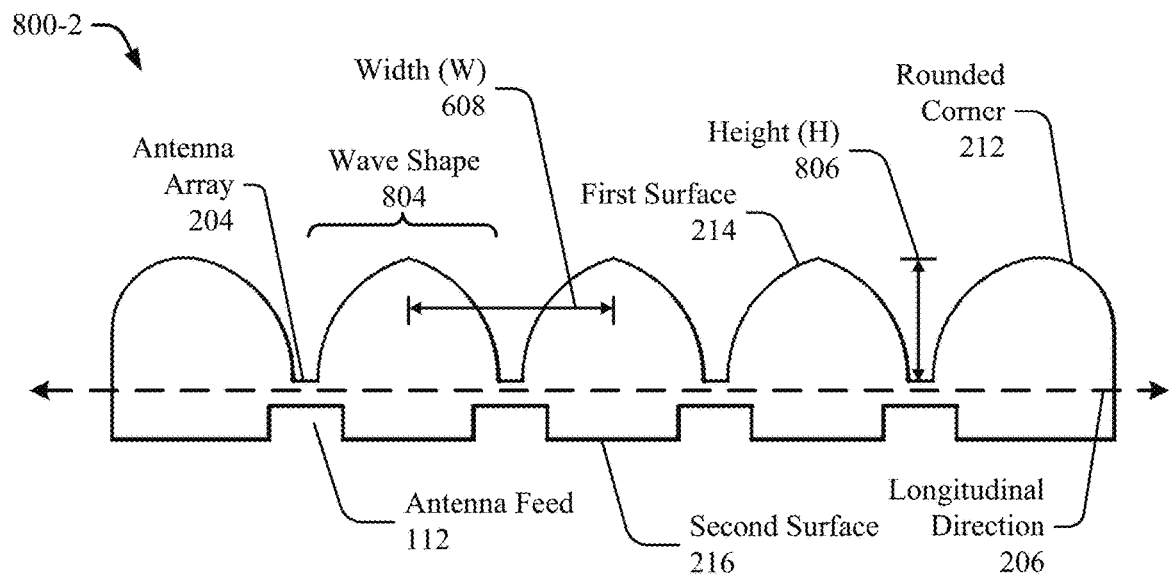
Figure 8C:
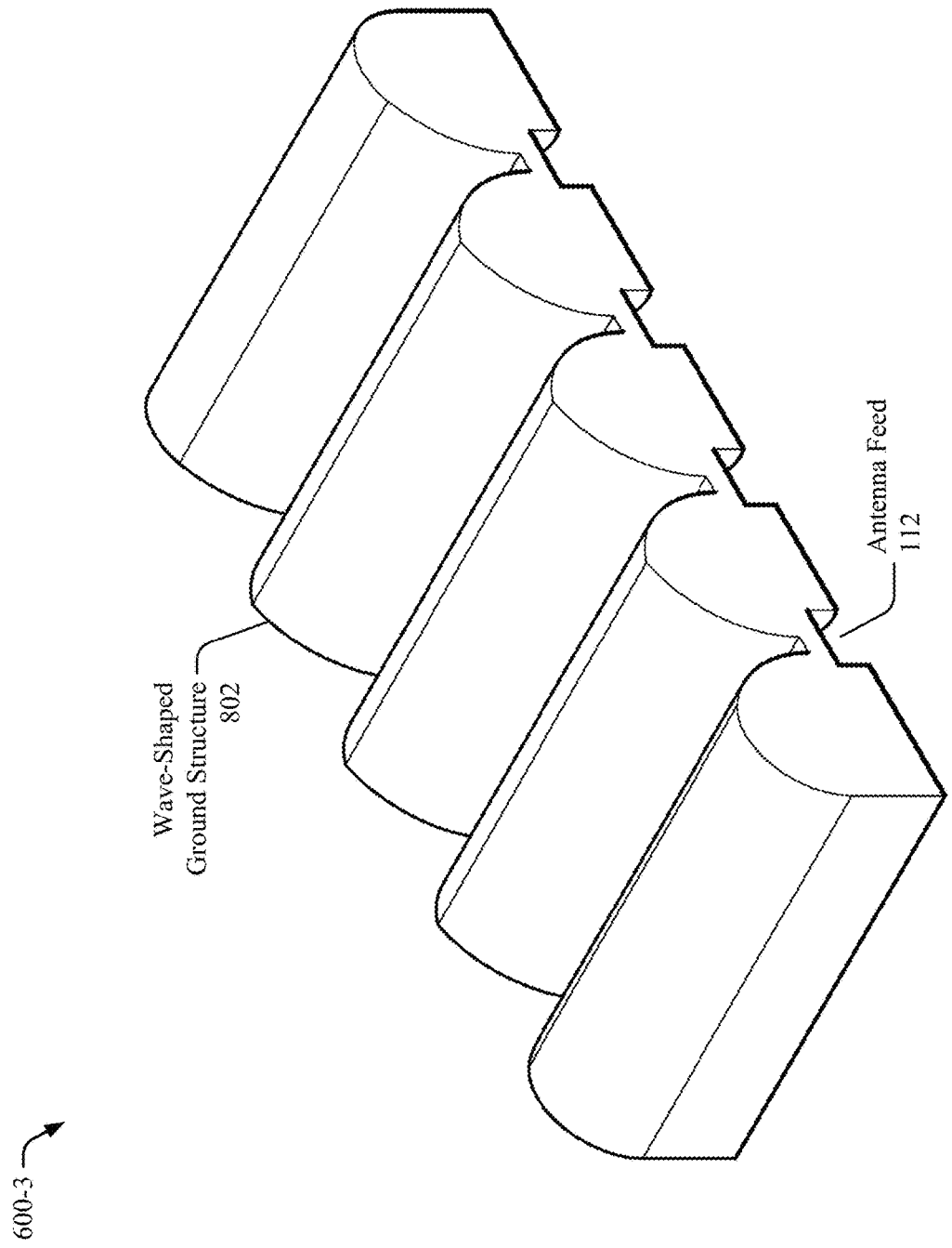

FIGS. 8A, 8B, and 8C illustrate views 800-1, 800-2, and 800-3, respectively, of an example wave-shaped ground structure 802 for the antenna arrays 204. The wave-shaped ground structure 802 is another example of the wave-shaped ground structure 110 of FIG. 1. The views 800-1, 800-2, and 800-3 provide a top, side, and perspective view of the wave-shaped ground structure 802, respectively.

The wave-shaped ground structure 802 includes the antenna feeds 112, the antenna elements 114, and a wave shape 804. The wave-shaped ground structure 802 also includes multiple antenna arrays 204 separated in a longitudinal direction 206 along the first surface 214. Each antenna array 204 includes one or more antenna elements 114 configured to emit or detect electromagnetic (EM) energy. The antenna arrays 204 can include aperture antennas, microstrip antennas, microstrip patch antennas, dipole antennas, SIW antennas, slot array antennas, waveguide end-array antennas, or horn antennas. The antenna arrays 204 of the wave-shaped ground structure 802 can be transmit antennas to emit EM energy or receive antennas to detect EM energy. The wave-shaped ground structure 802 can also include a subset of transmit antenna arrays and a subset of receive antenna arrays. The antenna arrays 204 are generally uniformly positioned in the longitudinal direction 206 and include an equal number of antenna elements 114. The antenna elements 114 of the antenna arrays are generally uniformly positioned in the latitudinal direction 208.

The antenna elements 114 or the antenna arrays 204 operably connect to a respective antenna feed 112. The antenna feeds 112 are positioned on or in the second surface 216 of the wave-shaped ground structure 802. The second surface 216 is opposite the first surface 214 of the wave-shaped ground structure 802. The antenna feeds 112 are generally uniformly positioned in the longitudinal direction 206.

As depicted in FIG. 8B, the antenna feeds 112 can form an approximately rectangular opening or channel in the side view 800-2 of the wave-shaped ground structure 802. In other implementations, the antenna feeds 112 can form an approximately square, oval, or circular opening in the side view 800-2 of the wave-shaped ground structure 802.

As illustrated in the side view 800-2, the first surface 214 of the wave-shaped ground structure 802 includes the wave shapes 804 adjacent to and between the antenna arrays 204. The wave shape 604 includes the rounded corners 212, a height (H) 806, and a width (W) 808. The wave shape 804 can represent an approximately spearhead shape with rounded corners at the longitudinal ends of the wave-shaped ground structure 802.

Similar to the radiation pattern illustrated in FIG. 7, the wave shapes 804 of the wave-shaped ground structure 802 allow the antenna arrays 204 to generate a narrow radiation pattern in an azimuth or elevation plane and a higher gain within a desired portion of the field-of-view. The narrow radiation pattern may be particularly advantageous for use in an automotive context, such as detecting objects in a roadway in a vehicle's travel path. The narrow beamwidth allows a vehicle's radar system to detect objects in a particular field-of-view (e.g., immediately in front of the vehicle). As one example, a radar system placed near the front of a vehicle can use a narrow beamwidth to focus on detecting objects immediately in front of the vehicle instead of objects located toward a side of the vehicle. As a specific example, the narrow coverage or beam width can concentrate the radiated EM energy within −30 to 30 degrees of a direction following a travel path of the vehicle 104. In contrast, a waveguide without the described wave-shaped ground structure 802 may provide a relatively wide radiation pattern.

The rounded corners 212 of the wave shape 804 also improve the similarity of radiation patterns of the antenna arrays 204 in azimuthal or elevational planes. The height 806 and the width 808 of the wave shape 804 can be configured to vary the narrow radiation pattern. The height 806 and the width 808 of the wave shapes 804 can be determined by building and optimizing a model of the wave-shaped ground structure 802 to produce the desired radiation pattern.

Example Method

Figure 9:
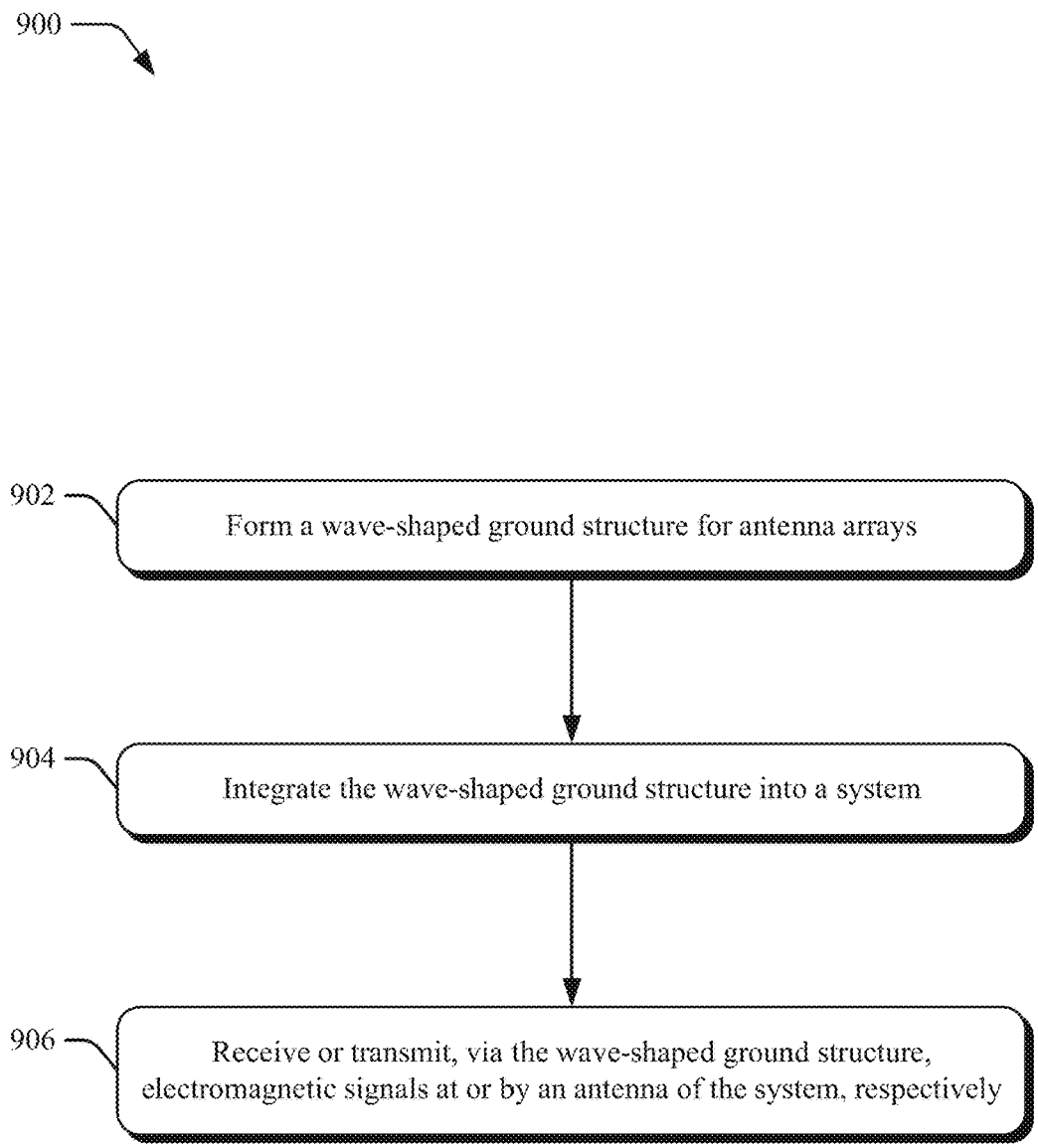
FIG. 9 illustrates an example method for manufacturing a wave-shaped ground structure for antenna arrays following techniques, apparatuses, and systems of this disclosure.

FIG. 9 illustrates an example method 900 that can be used for manufacturing a wave-shaped ground structure for antenna arrays, following techniques, apparatuses, and systems of this disclosure. Method 900 is shown as sets of operations (or acts) performed, but not necessarily limited to the order or combinations in which the operations are shown herein. Further, any of one or more of the operations may be repeated, combined, or reorganized to provide other methods. In portions of the following discussion, reference may be made to the environment 100 of FIG. 1 and entities detailed in FIGS. 1 through 8C, reference to which is made for example only. The techniques are not limited to performance by one entity or multiple entities.

At 902, a wave-shaped ground structure for antenna arrays is formed. For example, the wave-shaped ground structure 110, 202, 402, 602, and/or 802 can be stamped, etched, cut, machined, cast, molded, or formed in some other way.

At 904, the wave-shaped ground structure is integrated into a system. For example, the wave-shaped ground structure 110, 202, 402, 602, and/or 802 is electrically coupled to an antenna.

At 906, electromagnetic signals are received or transmitted via the wave-shaped ground structure at or by an antenna of the system, respectively. For example, the antenna receives or transmits signals captured via the wave-shaped ground structure 110, 202, 402, 602, and/or 802 and routed through the radar system 102.

EXAMPLES

In the following section, examples are provided.

Example 1: A radar system comprising: a ground structure that comprises: a first surface of the ground structure, the first surface having a wave shape; multiple antenna arrays separated in a longitudunal direction on the first surface of the ground structure, each of the antenna arrays having one or more antenna elements configured to emit or detect electromagnetic (EM) energy; and antenna feeds separated in the longitudunal direction on a second surface of the ground structure, the second surface of the ground structure being opposite the first surface of the ground structure, each of the antenna feeds being operably connected to a respective antenna array.

Example 2: The radar system of example 1, wherein the wave shape includes rounded corners and an approximately rectangular shape.

Example 3: The radar system of example 1, wherein the wave shape includes rounded corners and an approximately right-triangle shape.

Example 4: The radar system of example 3, wherein the approximately right-triangle shape has a height and the height is configurable to adjust an asymmetrical radiation pattern of the multiple antenna arrays.

Example 5: The radar system of example 1, wherein the wave shape includes rounded corners and an approximately isosceles-triangle shape.

Example 6: The radar system of example 5, wherein the approximately isosceles-triangle shape has a height and a width and the height and the width are configurable to adjust a radiation pattern of the multiple antenna arrays.

Example 7: The radar system of example 1, wherein the wave shape includes rounded corners and an approximately spearhead shape.

Example 8: The radar system of example 7, wherein the approximately spearhead shape has a height and a width and the height and the width are configurable to adjust a radiation pattern of the multiple antenna arrays.

Example 9: The radar system of any of examples 1 through 8, wherein the multiple antenna arrays are uniformly separated in the longitudinal direction on the first surface of the ground structure.

Example 10: The radar system of any of examples 1 through 9, wherein the antenna elements of the multiple antenna arrays are uniformly separated in a latitudinal direction on the first surface of the ground structure, the latitudinal direction being orthogonal to the longitidunal direction on the first surface of the ground structure.

Example 11: The radar system of any of examples 1 through 10, wherein the multiple antenna arrays comprise transmit antenna arrays, receive antenna arrays, or a combination of both.

Example 12: The radar system of any of examples 1 through 11, wherein the multiple antenna arrays each comprise an equal number of antenna elements.

Example 13: The radar system of any of examples 1 through 12, wherein the multiple antenna arrays comprise at least one of aperture antennas, microstrip antennas, microstrip patch antennas, dipole antennas, substrate-integrated waveguide (SIW) antennas, slot array antennas, waveguide end-array antennas, or horn antennas.

Example 14: A system comprising: an antenna; a device configured to transmit or receive electromagnetic signals via the antenna; and a ground structure that comprises: a first surface of the ground structure, the first surface having a wave shape; multiple antenna arrays separated in a longitidunal direction on the first surface of the ground structure, each of the antenna arrays having one or more antenna elements configured to emit or detect electromagnetic (EM) energy; and antenna feeds separated in the longitidunal direction on a second surface of the ground structure, the second surface of the ground structure being opposite the first surface of the ground structure, each of the antenna feeds being operably connected to a respective antenna array.

Example 15: The system of example 14, wherein the wave shape includes rounded corners and an approximately rectangular shape.

Example 16: The system of example 14, wherein the wave shape includes rounded corners and an approximately right-triangle shape.

Example 17: The system of example 14, wherein the wave shape includes rounded corners and an approximately isosceles-triangle shape.

Example 18: The system of example 14, wherein the wave shape includes rounded corners and an approximately spearhead shape.

Example 19: The system of any of examples 14 through 18, wherein the device comprises a radar system.

Example 20: The system of any of examples 14 through 19, wherein the system is a vehicle.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the scope of the disclosure as defined by the following claims.

What is claimed is:

1. A radar system comprising:
  a ground structure that comprises:
    a first surface of the ground structure, the first surface having a wave shape;
    multiple antenna arrays separated in a longitudinal direction on the first surface of the ground structure, each of the antenna arrays having one or more antenna elements configured to emit or detect electromagnetic (EM) energy; and
    antenna feeds separated in the longitudinal direction on a second surface of the ground structure, the second surface of the ground structure being opposite the first surface of the ground structure on opposite sides of the ground structure, each one of the antenna feeds is opposite to a different one of the multiple antenna arrays on the opposite sides of the ground structure, each of the antenna feeds being operably connected to a respective antenna array.

2. The radar system of claim 1, wherein the wave shape includes rounded corners and an approximately rectangular shape.

3. The radar system of claim 1, wherein the wave shape includes rounded corners and an approximately right-triangle shape.

4. The radar system of claim 3, wherein the approximately right-triangle shape has a height and the height is configurable to adjust an asymmetrical radiation pattern of the multiple antenna arrays.

5. The radar system of claim 1, wherein the wave shape includes rounded corners and an approximately isosceles-triangle shape.

6. The radar system of claim 5, wherein the approximately isosceles-triangle shape has a height and a width and the height and the width are configurable to adjust a radiation pattern of the multiple antenna arrays.

7. The radar system of claim 1, wherein the wave shape includes rounded corners and an approximately spearhead shape.

8. The radar system of claim 7, wherein the approximately spearhead shape has a height and a width and the height and the width are configurable to adjust a radiation pattern of the multiple antenna arrays.

9. The radar system of claim 1, wherein the multiple antenna arrays are uniformly separated in the longitudinal direction on the first surface of the ground structure.

10. The radar system of claim 1, wherein the antenna elements of the multiple antenna arrays are uniformly separated in a latitudinal direction on the first surface of the ground structure, the latitudinal direction being orthogonal to the longitudinal direction on the first surface of the ground structure.

11. The radar system of claim 1, wherein the multiple antenna arrays comprise transmit antenna arrays, receive antenna arrays, or a combination of both.

12. The radar system of claim 1, wherein the multiple antenna arrays each comprise an equal number of antenna elements.

13. The radar system of claim 1, wherein the multiple antenna arrays comprise at least one of aperture antennas, microstrip antennas, microstrip patch antennas, dipole antennas, substrate-integrated waveguide (SIW) antennas, slot array antennas, waveguide end-array antennas, or horn antennas.

14. A system comprising:
  an antenna;
  a device configured to transmit or receive electromagnetic signals via the antenna; and
  a ground structure that comprises:
    a first surface of the ground structure, the first surface having a wave shape;
    multiple antenna arrays separated in a longitudinal direction on the first surface of the ground structure, each of the antenna arrays having one or more antenna elements configured to emit or detect electromagnetic (EM) energy; and
    antenna feeds separated in the longitudinal direction on a second surface of the ground structure, the second surface of the ground structure being opposite the first surface of the ground structure, each of the antenna feeds defining a hollow channel and being operably connected to a respective antenna array.

15. The system of claim 14, wherein the wave shape includes rounded corners and an approximately rectangular shape.

16. The system of claim 14, wherein the wave shape includes rounded corners and an approximately right-triangle shape.

17. The system of claim 14, wherein the wave shape includes rounded corners and an approximately isosceles-triangle shape.

18. The system of claim 14, wherein the wave shape includes rounded corners and an approximately spearhead shape.

19. The system of claim 14, wherein the device comprises a radar system.

20. The system of claim 19, wherein the system is a vehicle.

21. A radar system comprising:
  a ground structure that comprises:
    a first surface of the ground structure, the first surface having a wave shape;
    multiple antenna arrays separated in a longitudinal direction on the first surface of the ground structure, each of the antenna arrays having one or more antenna elements configured to emit or detect electromagnetic (EM) energy; and
    antenna feeds separated in the longitudinal direction on a second surface of the ground structure, the second surface of the ground structure being opposite the first surface of the ground structure on opposite sides of the ground structure, each one of the antenna feeds is opposite to a different one of the multiple antenna arrays on the opposite sides of the ground structure, each of the antenna feeds defining a hollow channel and operably connected to a respective antenna array.

\* \* \* \* \*